Aug. 31, 1948.                J. W. PAYNE ET AL                2,448,272
                    METHOD AND APPARATUS FOR SEPARATION
                         OF VAPORS FROM A CONTACT MASS
Filed Aug. 11, 1943                                    3 Sheets-Sheet 1
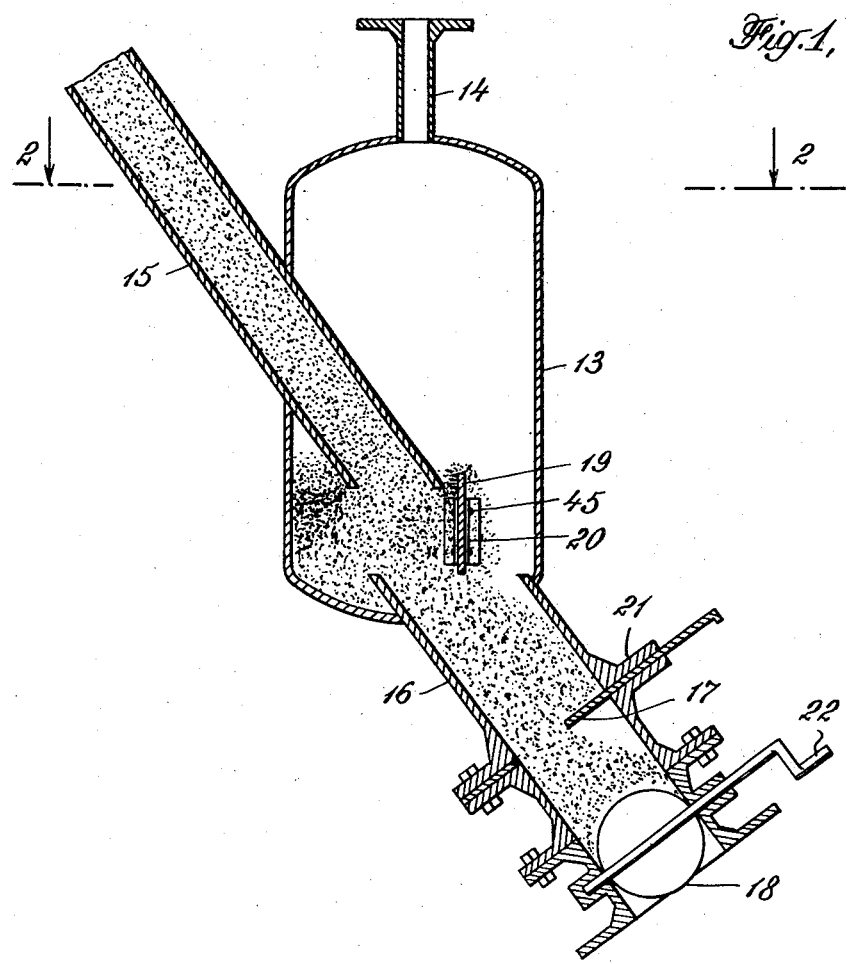
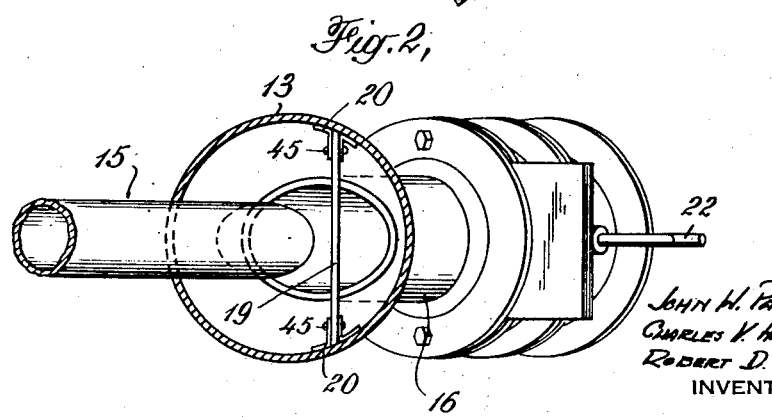
JOHN W. PAYNE
CHARLES V. HORNBERG
ROBERT D. DREW
INVENTORS
BY
ATTORNEY

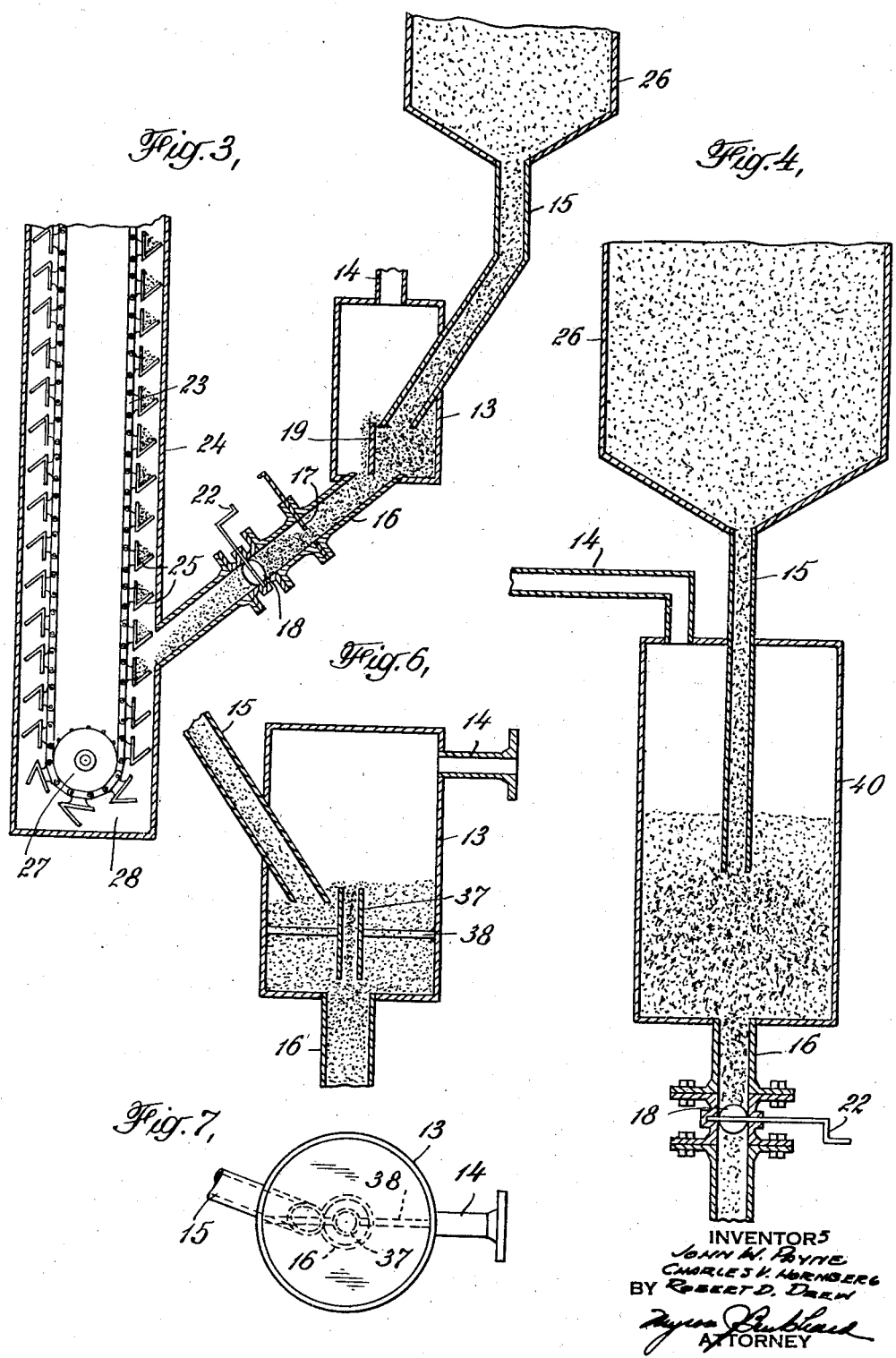

Aug. 31, 1948.
J. W. PAYNE ET AL
2,448,272
METHOD AND APPARATUS FOR SEPARATION
OF VAPORS FROM A CONTACT MASS
Filed Aug. 11, 1943
3 Sheets-Sheet 3
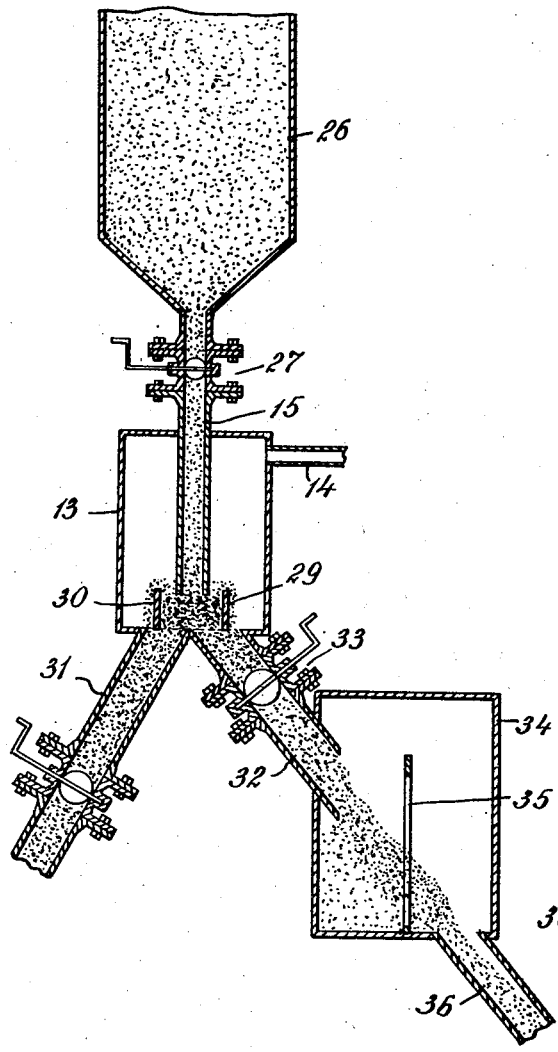
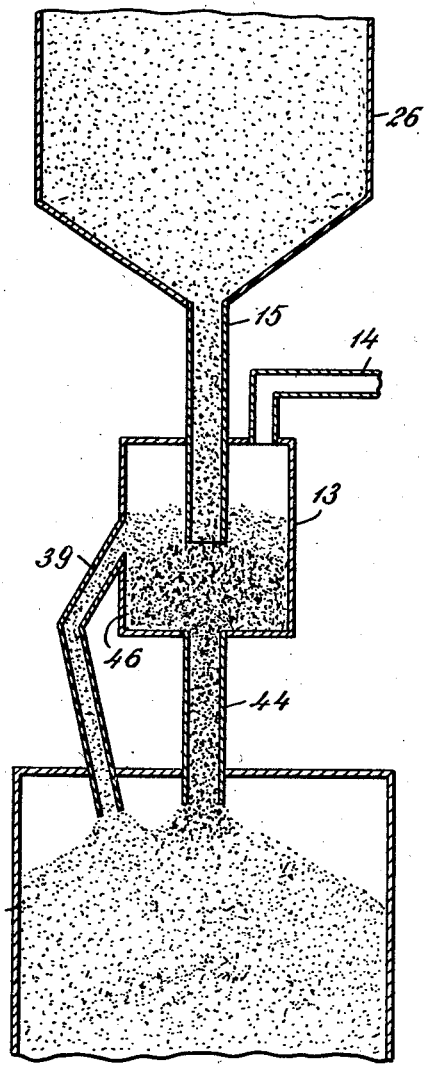
John H. Payne
Charles V. Hoenberg
Robert D. Drew
INVENTORS
BY
ATTORNEY

UNITED STATES PATENT OFFICE 2,448,272

METHOD AND APPARATUS FOR SEPARATION OF VAPORS FROM A CONTACT MASS

John W. Payne, Woodbury, Charles V. Hornberg, Wenonah, and Robert D. Drew, Woodbury, N. J., assignors to Socony-Vacuum Oil Company, Incorporated, a corporation of New York Application August 11, 1943, Serial No. 498,258

13 Claims. (Cl. 183—1)

This invention has to do with an auxiliary method and apparatus to be used in conjunction with conducting reaction of fluid reactants such as hydrocarbon vapors in the presence of a moving bed of particle form solid contact material which may be or may not be catalytic to the desired reaction. Exemplary of the processes of this kind is the cracking conversion of hydrocarbons, it being well know that hydrocarbons of gas oil nature boiling between about 500° F. and about 750° F. may be substantially cracked to gasoline by passing them at reaction conditions of temperature and pressure such as for example, temperatures of the order of 825° F. and at pressures usually somewhat above atmospheric in contact with a solid absorptive catalytic contact mass.

In a most recent form this operation has been developed as one in which the particle form solid contact material passes cyclically through two zones or vessels in the first of which the cracking reaction takes place, usually at some super-atmospheric pressure, and in the second of which the contaminant materials formed upon the contact mass by the reaction are burned off, usually at a super-atmospheric pressure, by means of a fluid regeneration medium such as a combustion supporting gas. In order to effect the continuous cylic flow of the contact material, it is permitted to pass from each vessel through a pipe or pipes, in the length of which are usually inserted throttling valves, to elevators which transport it to the feeding chamber above the other vessel.

This invention has specifically to do with the construction details and method of use of an important auxiliary apparatus to be inserted in that part of a system, such as that above described, through which the granular contact material flows from pressure operated reactors or regenerators to elevators or other vessels operated under lower pressures. Since it is immaterial to the function of the apparatus of this invention whether the contact material flows through a drain pipe from a pressure operated reactor to an elevator operated under a lower pressure, or whether it flows through a drain pipe or restricted withdrawal passageway from any other vessel in which it is contacted with a fluid under a pressure to any other vessel operated under a lower pressure, the terms reactor and elevator, except where otherwise stated hereinafter in the explanation of this invention and in claiming the invention, will be used in a sense sufficiently broad to include the latter meaning regardless of the exact purpose or use of such vessels.

Heretofore in processes involving the flow of particle form solid contact mass material from reaction vessels in which the solid material is contacted with a fluid under pressure, the solid material has been permitted to pass from said reaction vessel through a section of drain pipe and through a flow regulating device inserted therein as a substantially continuous column of granular material and then, without further throttling or restriction, through the remaining length of said drain line into the buckets of a continuous bucket link type elevator operating at a pressure substantially below that of the reaction vessel. Generally in order to avoid the loss of reactant vapors through the drain pipe a means is provided in the lower part of the reactor for introducing an inert blanket or seal vapor such as steam or flue gas, a substantial amount of which seal vapor is forced down through and along with the granular material in the drain pipe by the differential pressure between the reactor and the elevator. Since said seal vapor may flow through the drain pipe at considerably higher velocities than the granular material it transfers part of its kinetic energy to the granular material in that section of the drain pipe at and beyond the throttling valve. This results in severe and undesirable attrition of the granular material as it is thrown against and forced through the constriction in the throttle valve and an interference with the direct flow of said material to the elevator buckets as part of it is blown by the vapor around and past the buckets and down into the elevator boot. Here it may be pulverized either by grinding between the elevator chain and guide wheel or between the floor of the elevator boot and the buckets. This is highly undesirable because of the importance to satisfactory operation of maintaining a given contact material particle size in the reaction vessels as well as loss of contact material; furthermore, overloading and jamming of the elevator may result. A further difficulty arises from the secondary fluctuation of flow rate of the granular material through the throttle valve in the drain pipe with any pressure fluctuations in the reaction vessels. This renders very difficult the achievement of a constant rate of granular material flow through the reaction vessels, or the maintenance of balanced levels in the two reaction vessels of the cyclic flow system.

A major object of this invention is to eliminate the above difficulties by insertion into the drain pipe between the reactor and elevators or between regenerators and elevators of a means for dissipating the kinetic energy of the vapors passing therethrough with and through the flowing column of granular material and of a means for separating the vapor from the granular material without appreciable attrition thereof or without interference with the normal operation of the throttle valve and of the elevator.

This can be accomplished by insertion in the above drain line at a point between the reactor and the throttling valve of a very large disengaging vessel having sufficient cross sectional area to prevent turbulence or boiling of the granular material by the disengaging vapor; but due to the limited amount of space usually available at the necessary location of such disengaging vessels, their use is generally neither possible nor practical. It is the specific object of this invention to insert in the drain pipe or passage between the reactor and elevator an apparatus which will accomplish this kinetic energy dissipation and this vapor-solid separation without interference with or elimination of the substantially continuous column of flowing granular material in the passage between the reactor and said apparatus, which apparatus will be of such size as to be economically feasible as well as consistent with the limited size of the space available for its use.

In order to readily understand this invention reference is now made to the drawings attached hereto, of which drawings Figure 1 shows a sectional elevation of such an apparatus which will hereinafter be referred to as a depressuring pot. Figure 2 shows a sectional plan view of the same apparatus and Figure 3 is a sectional elevation sketch showing its general arrangement as used in the drain pipe between a reactor and elevator. Figure 4 shows a somewhat different design, requiring a substantially larger depressuring pot than others described herein and useful only where space limitations are not vital. Figure 5 depicts the use of a modified depressuring pot design before a throttling valve and flow rate indicating device. Figure 6 and Figure 7 are vertical and horizontal sections, respectively, of another modification, while Figure 8 shows, in vertical section, still another modified design. All of these drawings are diagrammatic in character.

Turning to Figure 1, we find the sloping reactor drain pipe 15 connecting and extending a short distance into a depressuring pot 13. Seal vapors and a substantially continuous column of granular material flow down this pipe. Connected to the bottom of the depressuring pot so that its entrance is partly under the outlet end of pipe 15 is the sloping pipe 16, which is of somewhat larger size than pipe 15 and which serves as the passage for the granular material flowing through the rate control valve 18 to the elevator or low pressure vessel. In this pipe is also the baffle 17 the function of which will be later explained. Extending entirely across the bottom of the depressuring pot and dividing into two sections the entrance to pipe 16 is a vertical plate baffle 19 the extreme ends of which are connected to the depressuring pot shell, which baffle extends upwards a short distance above the level of the outlet end of pipe 15. This baffle effectively divides the entrance to the draw-off pipe 16 into two parts, one of which is on the opposite side of the baffle from the inlet pipe 15. The disengaged vapor outlet pipe 14 is shown at the top of the depressuring pot. Figure 2 is a sectional plan view of the same depressuring pot 13 showing the baffle plate 19 and the granular material inlet and outlet pipes 15 and 16 respectively.

Turning now to Figure 3 we find a sectional elevation view showing the insertion of a depressuring pot 13 in the granular material drain line between the reactor 26 and the elevator 24. In that part of the line 16 between the depressuring pot and the elevator is the granular material flow rate control butter-fly valve 18 equipped with adjustment handle 22. The granular material in the absence of an appreciable amount of disturbing vapors, which vapors have been previously separated in the depressuring pot, does not fall from line 16 into the boot of the elevator but flows directly into the buckets which pass as a substantially continuous train just opposite the outlet from pipe 16 and which convey the granular material up to disposal, such as to the regenerator inlet.

We may now return to Figure 1 for a study of the depressuring pot operation. As has been previously mentioned space limitations usually preclude the use of large vapor-granular material disengaging vessels, and as a consequence the cross section of the depressuring pot is usually relatively small. This results in considerable boiling and turbulence of the granular material as the reactor seal vapor disengages therefrom in the depressuring pot, and the level of the granular material in the pot tends to build up over the level of the outlet end of pipe 15, even though the granular material is continuously withdrawn through pipe 16. It has been discovered that this granular material level build-up, in the absence of the baffle 19 will reach an equilibrium height above the outlet end of pipe 16, which equilibrium height is dependent upon the rate of vapor flow from pipe 15 up through the bed of granular material, the temperature and pressure, and upon the nature and size of the granular material involved. Thus, for example, it has been found that with a contact mass material of 0.6 specific density and 0.16" average diameter and a rate of gas flow therethrough of 290 cubic feet per minute per square foot of bed cross section, at atmospheric conditions, the granular material level build-up above the outlet end of pipe 15 will be approximately 19 inches. In some instances where space permits, it has been found feasible to design the depressuring pot of sufficient length to absorb this level build-up and still allow a sufficient additional height above the surface of the granular material to prevent its entrainment from the pot through the vapor draw-off. Such an arrangement is shown in Figure 4, in which 40 represents the depressuring pot and 15 and 16 the granular material inlet and outlet pipes respectively and 14, the vapor outlet pipe. Although no baffle is required in this arrangement, care must be taken that the minimum distance from the outlet end of pipe 15 to the inlet of pipe 16 is considerably greater than the minimum distance from the outlet end of pipe 16 to the level of the granular material bed built up above it, otherwise considerable amounts of vapors will be forced down through pipe 16 along with the granular material, thereby defeating the purpose of the depressuring pot.

Returning again to Figure 1, it is usually preferable to use a baffle such as 19, the function of which is to provide an overflow or drain passage for the granular material which builds up over the level of the outlet end of pipe 15, in which overflow or drain passage only a small amount or no vapor-solid disengagement takes place. Thus the vapor-solid disengaging takes place entirely in that section of the depressuring pot on the inlet pipe 15 side of the baffle 19; and when the level of the granular material builds up to the top of the baffle 19 or slightly higher, the granular material spills over the baffle and falls down through the space on the other side, up through which the rate of vapor flow is low, and into the drain line 16 thereby stopping any further build-up of the level in the disengaging section. It is important that the pipe 15 be so positioned within the depressuring pot that the minimum distance from its outlet end to the bottom edge of the baffle 19 is considerably greater than the minimum distance from said outlet end to the surface of the granular material bed built up above it. This forces most of the disengaging vapors to flow directly up from the outlet of pipe 15 through the bed of granular material above said outlet, rather than down under the baffle 19 and up through the overflow or drain passage on the other side.

In installations which, due to space limitations, permit only a very short length of sloping drain pipe 16 between the depressuring pot and the throttling valve therein, a vapor seal baffle 17 will be required. The necessity for this can be seen by imagining a line drawn at approximately 35° with the horizontal from the bottom edge of baffle 19 to the point of intersection of said line with the upper side of pipe 16. This line will represent the surface of the granular material as it flows into pipe 16 when there is no overflow over the baffle 19. It approximately represents this surface when the amount of overflow is low and thus there is then a void space in the top of pipe 16 extending down even as far as the valve 18, if the distance between the depressuring pot and throttling valve is very short. In order to prevent vapor from the depressuring pot from passing down this void space through the valve and then down into the elevator, the adjustable seal baffle 17 is provided, which baffle closes off the vapor passage without materially affecting the flow of granular material. This is especially useful when the pressure in the depressuring pot is slightly higher than in the receiving vessel. It is evident that in installations in which the length of pipe 16 between the depressuring pot and the throttling valve may be adequate and/or where vertical draw-off pipes are used, baffle 17 may be unnecessary.

Inasmuch as the amount of vapor and granular material to be disengaged and the amount of kinetic energy to be dissipated will depend upon the size of the main system, the rate of granular material flow and the differential pressure between the reactor and the elevator, as well as upon the length and diameter of the drain pipe 15, the size, density and nature of the granular material and the temperature and pressure of the system, it is impossible to exactly specify any given invariable dimensions for depressuring pot design. Broadly, however, the following specifications have been found to be important:

1. The granular material inlet to the depressuring pot, pipe 15, must be so positioned therein that the minimum distance from its outlet end to the bottom edge of the baffle 19 and/or to the entrance end of pipe 16, is considerably greater than the minimum distance from its outlet end to the surface of granular material above it.

2. The top of the baffle 19, when used, should be never lower and preferably somewhat above the level which would be attained by the granular material when flowing through the depressuring pot under conditions where no vapor was disengaged.

3. The baffle 19 must be so positioned as to form or provide for a granular material overflow and drain passageway which is of sufficient cross sectional area and which is free from vapor-solid disengagement to a great extent or at least to such extent as to permit continuous and uninterrupted passage therethrough and draining therefrom of the maximum amount of granular material that will overflow the baffle. The amount of this granular material overflow is dependent upon the factors enumerated at the beginning of this paragraph and also upon the cross sectional area of the disengaging space provided in the depressuring pot and upon the height of the baffle 19 above the outlet end of pipe 15. This amount can be experimentally determined.

4. The cross section of the depressuring pot above the level of the overflowing granular material must be such that the velocity of the disengaged vapor passing up therethrough will not be sufficient to entrain or carry, at least, that size of granular material which it is desirable to retain in the system. This limiting velocity is dependent upon the temperature and pressure of the system upon the nature of the vapor and granular material involved, and it may be experimentally determined or calculated from experimental data.

5. The length of the space above the level of the overflowing granular material must be sufficient to permit settling substantially all of that size granular material which may be blown up into said space due to boiling of the granular material at its surface. This required space length is dependent upon the variables enumerated at the beginning of this paragraph and upon the cross sectional area of the disengaging space provided in the depressuring pot, and it may be experimentally determined. It should preferably be not less than about six inches.

6. The vapor discharge line should be of sufficient size to permit withdrawal of the disengaged vapors without imposing an appreciable back pressure on the depressuring pot.

7. The granular material main withdrawal pipe 16 from the depressuring pot should be of sufficient size to handle the maximum flow of granular material through pipe 15 and should have inserted in its length or at its outlet end a throttling device so that part of the pipe will contain a substantially continuous column of flowing granular material which will serve as a vapor seal.

With close observance of the above broad specifications, several granular material overflow and drain arrangements are possible. Thus, Figure 5 shows a depressuring pot 13 to which the granular material and seal vapor flow from reactor 26 through vertical pipe 15 and auxiliary safety shut-off valve 27. In this instance two draw-off pipes 31 and 32 are shown connected to the bottom of the depressuring pot; also two overflow baffles 29 and 30 are used. In the pipe 32 is a throttling valve 33 followed by a granular material flow indicating device which indicates the rate of flow by means of a calibrated slot 35. The successful operation of such measuring devices is largely dependent upon the absence of high velocity vapor flow.

Another baffle arrangement is shown in Figures 6 and 7 which should be read together. Here a centrally located pipe 37, open on both ends and supported by rods 38, which are connected to the walls of the depressuring pot, serves as a granular material overflow passage. The overflow passes down pipe 37 and then out through drain pipe 16 along with the rest of the granular material flow.

Still another arrangement is shown in Figure 8 in which the granular material and seal vapor from the reactor 26 enter the depressuring pot 13 through vertical line 15 and the overflow material is withdrawn through pipe 39. This overflow pipe 39 and also the main drain pipe 44 furnish the passage for granular material to the top of the bed in vessel 30, which bed serves as the flow throttling device. In this instance the lower part of the side 46 of the depressuring pot serves the function of the overflow baffle. In an installation such as shown in Figure 8, the pressure in vessel 30, although substantially below that in reactor 26 may be above atmospheric pressure, in which case a pressure control device on the disengaged vapor outlet line 14 would maintain the depressuring pot pressure substantially equal to that in vessel 30.

In the claiming of this invention the term "gas" is used in a broad sense as meaning that the material involved exists in the gaseous phase under the existing conditions of pressure and temperature regardless of what may be the normal phase of that material under ordinary atmospheric conditions. The expressions "pressure release zone" and "pressure release chamber" are intended as meaning a zone or chamber into which a mixed stream of solid and gas are introduced in the indicated manner from a zone of higher pressure so that in the pressure release zone or chamber a reduction in pressure occurs with a resulting tendency for disengagement of solid and gas.

All the foregoing illustrations and examples of the application and construction of the depressuring pot have been intended merely as illustrative and are in no way intended to limit the scope of this invention.

We claim:

1. That method of handling the transfer of a moving stream of particle-form solid from a confined zone maintained under super-atmospheric pressure with a gaseous atmosphere to a zone of substantially less pressure which comprises withdrawing particle-form solid and admixed gas from said high-pressure zone as a substantially compact, confined stream of downwardly-flowing solid material and admixed gas, introducing said stream only into a pressure release zone of substantially greater cross-sectional area than said stream and maintained only partially filled with said solid, said introduction being at a point within and below the surface of the body of solid maintained within said pressure release zone and substantially above the bottom of said pressure release zone, maintaining the pressure in said pressure release zone at a level not substantially higher than that in the lower pressure zone to which the solid is to be transferred by withdrawing separated gases from said pressure release zone from a point above the level of the body of solid maintained therein, withdrawing a compact stream of solid from the bottom of the pressure release zone and passing it to the zone of less pressure.

2. In a system involving the movement of solid between high and low pressure chambers, means defining a chamber adapted for gas-solid contact operations under superatmospheric pressure, a low-pressure chamber therebelow, means defining a closed pressure release chamber at a level intermediate said high and low pressure chambers, conduit means extending downwardly from said high-pressure chamber into said pressure release chamber and terminating within said pressure release chamber at a substantial vertical distance above the bottom thereof and below the top thereof, for passage of solid material and admixed gas from said high pressure chamber into said pressure release chamber, conduit means extending downwardly from the bottom of said pressure release chamber to said low-pressure chamber for flow of solid material to said low-pressure chamber, throttling means in said last-named conduit, adjustable to maintain the pressure release chamber filled with solid to a level below its top but above the point of mixed gas-solid entry, a member within said chamber providing therein two substantially separate passages for solid flow from a level above the inlet end of said first named conduit and below the top of said chamber to said last named conduit means, said member being so positioned that at least portions of both of said separate passages are vertically directly over said last named conduit means and that the solid and admixed gas from said first named conduit flows from said first named conduit directly into only one of said separate passages, and conduit means on the top of said pressure release chamber for removal of separated gas.

3. Apparatus for effecting transfer of particle-form solid material from the gas-filled high pressure zone to a zone of lesser pressure comprising a pressure release chamber, conduit means dependent within said chamber to lead a compact stream of solid and gas from the high pressure zone to a point within the pressure release chamber and spaced vertically above the bottom thereof, within said chamber a partition extending upwardly from the bottom thereof to a point above the level of mixed gas-solid entry, arranged to divide said chamber into two portions into one of which the first named conduit discharges and also to determine the level to which solid may accumulate above and around said conduit by permitting overflow of solid into the second portion of the chamber, gas discharge conduit means leading from a point in the chamber spaced well above said partition, solid discharge conduit means draining solid from both the discharge section and overflow section of said chamber and leading to the zone of lesser pressure, said solid discharge conduit means being so positioned with respect to said partition that its inlet end is positioned vertically near the lower edge of said partition and that a portion of the area of its inlet end lies directly below and horizontally on each side of said partition, and rate-of-flow control means in said last named conduit.

4. Apparatus for effecting transfer of particle-form solid material from a gas-filled high pressure zone to a zone of lesser pressure comprising a pressure release chamber, conduit means dependent within said chamber to lead a compact stream of solid and gas from the high pressure zone to a point within the pressure release chamber and spaced vertically above the bottom thereof, within said chamber a partition extending upwardly from the bottom thereof to a point above the level of mixed gas-solid entry, arranged to divide said chamber into two portions into one of which the first named conduit discharges and also to determine the level to which solid may accumulate above and around said conduit by permitting overflow of solid into the second portion of the chamber, the level of the top of said partition being a less distance above the outlet of the first named conduit than the distance that outlet is spaced above the entry to the discharge conduit named later herein, gas discharge conduit means leading from a point in the chamber spaced well above said partition, solid discharge conduit means draining solid from both the discharge section and overflow section of said chamber and leading to the zone of lesser pressure, said solid discharge conduit means being of greater cross-sectional area than said first named conduit means and being so positioned with respect to said partition that a portion of the area of its inlet end lies below and to either side of said partition, and rate-of-flow control means in said last named conduit.

5. That method of handling the transfer of a particle-form solid material from a confined zone maintained under superatmospheric pressure to a zone of substantially less pressure without excessive attrition of the solid particles which method comprises: withdrawing said solid material and admixed gas from said high-pressure zone as a substantially compact, confined stream of downwardly-moving solid material and admixed gas, introducing only said stream into a pressure release zone of substantially greater cross-sectional area than said stream and maintained only partially filled with a body of said solid material, said stream being introduced to said pressure release zone at a location within and below the surface of the body of solid material maintained therein and substantially nearer to the surface of said body than to the bottom of said pressure release zone, withdrawing separated gas from said pressure release zone at a location above the level of the body of solid material therein at a rate sufficient to maintain the pressure in said pressure release zone substantially below that in said high-pressure zone and near that in said low-pressure zone, and withdrawing solid material from the bottom of said pressure release zone to said low-pressure zone as a substantially compact, downwardly extending throttled stream.

6. That method of handling the transfer of a particle-form solid material from a confined zone maintained under superatmospheric pressure to a zone of substantially less pressure without excessive attrition of the solid particles which method comprises: withdrawing said solid material and admixed gas from said high-pressure zone as a substantially compact, confined stream of downwardly-moving solid material and admixed gas, introducing only said stream into a pressure release zone of substantially greater cross-sectional area than said stream and maintained only partially filled with a body of said solid material, said stream being introduced to said pressure release zone at a location within and below the surface of the body of solid material maintained therein and substantially nearer to the surface of said body than to the bottom of said pressure release zone, withdrawing separated gas from said pressure release zone at a location above the level of the body of solid material therein at a rate sufficient to maintain the pressure in said pressure release zone substantially below that in said high-pressure zone and near that in said low-pressure zone, and withdrawing solid material from the bottom of said pressure release zone to said low-pressure zone as a substantially compact, confined stream, and throttling the flow of said stream so as to maintain that portion of said body of solid material maintained within said pressure release zone which is below the location of introduction of said stream from said high-pressure zone as a substantially compact, non-fluidized mass of solid particles.

7. That method of handling the transfer of a particle-form solid material from a confined zone maintained under superatmospheric pressure to a zone of substantially less pressure without excessive attrition of the solid particles which method comprises: withdrawing said solid material and admixed gas from said high-pressure zone as a substantially compact, confined stream of downwardly-moving solid material and admixed gas, introducing only said stream into a pressure release zone of substantially greater cross-sectional area than said stream and maintained only partially filled with a body of said solid material, said stream being introduced to said pressure release zone at a location within and below the surface of the body of solid material maintained therein and substantially nearer to the surface of said body than to the bottom of said pressure release zone, withdrawing separated gas from said pressure release zone at a location above the level of the body of solid material therein at a rate sufficient to maintain the pressure in said pressure release zone substantially below that in said high-pressure zone and near that in said low pressure zone, and withdrawing solid material from the bottom of said pressure release zone to said low-pressure zone as a substantially compact, downwardly-extending, throttled stream, and additionally withdrawing solid material from a location in said pressure release zone above said location of solid and gas introduction thereinto so as to control the level of the surface of said body of solid material maintained within said pressure release zone.

8. A method for transfer of particle-form solid material from a high-pressure to a low-pressure zone without excessive breakage of said solid material which method comprises: passing particle-form solid material with admixed gas from said high-pressure zone as a substantially compact, confined stream downwardly from said high-pressure zone to a location within a pressure release and gas-solid disengaging zone of substantially greater cross-sectional area than said stream, but of such limited cross-sectional area that said gas disengaging from said solid material causes the rise of a body of said solid material within said pressure release zone above the level of said location of its inlet thereinto, withdrawing solid material from the bottom of said pressure release zone as a substantially compact, confined, throttled stream to said low pressure zone, withdrawing an additional stream of said solid material from a location in said pressure release zone shortly above said location of solid and gas inlet thereinto so as to limit the level of build up of said solid material body within said pressure release zone and withdrawing separated gas from said pressure release zone from a location above the level of said body of solid material therein at a rate sufficient to maintain the pressure in said pressure release zone substantially below that in said high pressure zone and near that in said low pressure zone.

9. A method for transfer of particle-form solid material from a high-pressure to a low-pressure zone without excessive breakage of said solid material which method comprises: passing particle-form solid material as a substantially compact, confined stream admixed with gas from said high-pressure zone downwardly from said high-pressure zone to a location within a pressure release and gas-solid disengaging zone of a cross-sectional area greater than that of said stream but so limited that said gas undergoing pressure release causes the rise of a body of said solid material within said pressure release zone having a surface above that of the level of solid and gas inlet, conducting solid material from the bottom of said pressure release zone as a substantially compact, confined stream to said low-pressure zone and throttling the flow of said stream so as to control the rate of the solid flow in said first-named stream, withdrawing solid material from said pressure release zone at a level above said location of its inlet thereinto so as to limit the level of the surface of said body of solid material within said pressure release zone and combining said additional withdrawn solid material with said first withdrawal stream at a location before the point of throttling of said stream, and withdrawing said gas from said pressure release zone at a location above the surface of said body of solid material at a rate such as to maintain the pressure in said pressure release zone substantially below that in said high-pressure zone and near that in said low pressure zone.

10. In a system involving the movement of solid between high and low pressure chambers, means defining a chamber adapted for gas-solid contact operations under superatmospheric pressure, a low-pressure chamber therebelow, means defining a closed pressure release chamber at a level intermediate said high and low pressure chambers, conduit means extending downwardly from said high pressure chamber into said pressure release chamber and terminating within said pressure release chamber at a substantial vertical distance above the bottom thereof and below the top thereof, for passage of solid material and admixed gas from said high-pressure chamber into said pressure release chamber, conduit means extending downwardly from the bottom of said pressure release chamber to said low-pressure chamber for flow of solid material to said low pressure chamber, throttling means in said last-named conduit, adjustable to maintain the pressure release chamber filled with solid to a level below its top but above the point of mixed gas-solid entry, and conduit means on the top of said pressure release chamber for removal of separated gas, and means to withdraw solid material from a location in said pressure release chamber shortly above the level of the end of said solid inlet conduit within said pressure release chamber.

11. Apparatus for effecting transfer of particle-form solid material from a zone wherein it is contacted with a gas under pressure to a zone of lesser pressure comprising a closed pressure release chamber, conduit means dependent within said chamber for passage of a compact stream of said solid material with gas admixed from said high-pressure zone downwardly to a location within said pressure release chamber a substantial vertical distance above the bottom and below the top thereof, a solid discharge conduit extending downwardly from said pressure release chamber to said low-pressure zone, flow rate control means associated with said discharge conduit, a member supported within said pressure release chamber to provide a passage for flow of a separate stream of said solid material from a location within said pressure release chamber above the level of the outlet from said solid inlet conduit dependent thereinto and below the top of said pressure release chamber to a location within said discharge conduit, and an outlet conduit from the top of said pressure release chamber for removal of separated gas.

12. A method for transfer of particle-form solid material from a high-pressure to a low-pressure zone without excessive breakage of said solid material which method comprises: passing particle-form solid material with admixed gas from said high-pressure zone as a substantially compact, confined stream downwardly from said high-pressure zone to a location within a pressure release and gas-solid disengaging zone of substantially greater cross-sectional area than said stream and maintained only partially filled with a body of said solid material, withdrawing separated gas from said pressure release zone at a location above the level of said body of solid material therein at a rate sufficient to maintain the pressure in said pressure release zone substantially below that in said high pressure zone, withdrawing a compact stream of solid material from the bottom of said pressure release zone and passing said solid material to said low pressure zone, and additionally withdrawing solid material from a level in said pressure release zone above the level of said solid and admixed gas introduction thereinto so as to control the level of the surface of said body of solid material maintained within said pressure release zone.

13. In a system involving the movement of solid between high and low pressure chambers, means defining a chamber adapted for gas-solid contact operations under superatmospheric pressure, a low-pressure chamber therebelow, means defining a closed pressure release chamber at a level intermediate said high and low pressure chambers, conduit means extending downwardly from said high pressure chamber into said pressure release chamber and terminating within said pressure release chamber at a substantial vertical distance above the bottom thereof and below the top thereof, for passage of solid material and admixed gas from said high-pressure chamber into said pressure release chamber, conduit means extending downwardly from the bottom of said pressure release chamber to said low-pressure chamber for flow of solid material to said low pressure chamber, conduit means for removal of separated gas from the upper end of said pressure release chamber, and means to separately remove solid material from a location in said pressure release chamber shortly above the level of the end of said solid inlet conduit within said pressure release chamber.

JOHN W. PAYNE.
CHARLES V. HORNBERG.
ROBERT D. DREW.

(References on following page)

REFERENCES CITED

The following references are of record in the file of this patent:

UNITED STATES PATENTS

| Number | Name | Date |
|---|---|---|
| 727,030 | Tilghman | May 5, 1903 |
| 748,414 | Passburg | Dec. 29, 1903 |
| 955,606 | Moreau | Apr. 19, 1910 |
| 1,048,473 | Baker | Dec. 24, 1912 |
| 1,616,547 | Pontoppidan | Feb. 8, 1927 |
| 1,775,362 | Demarcus | Sept. 9, 1930 |
| 1,863,301 | Bechthold | Dec. 15, 1931 |
| 2,020,115 | Gray | Nov. 5, 1935 |
| 2,151,514 | Heinen | Mar. 21, 1939 |
| 2,304,827 | Jewell | Dec. 15, 1942 |
| 2,310,377 | Voorhees | Feb. 9, 1943 |
| 2,314,316 | Schlesman | Mar. 16, 1943 |
| 2,348,156 | Sheppard | May 2, 1944 |
| 2,356,697 | Rial | Aug. 22, 1944 |
| 2,367,281 | Johnson | Jan. 16, 1945 |